J. H. ROBERTSON AND D. JANKOWER.
DAYLIGHT MOTION PICTURES.
APPLICATION FILED NOV. 2, 1918.

1,331,081.

Patented Feb. 17, 1920.

Witnesses.

Inventors
James Hart Robertson
David Jankower

UNITED STATES PATENT OFFICE.

JAMES HART ROBERTSON AND DAVID JANKOWER, OF NEW YORK, N. Y.

DAYLIGHT MOTION-PICTURES.

1,331,081.

Specification of Letters Patent.  Patented Feb. 17, 1920.

Application filed November 2, 1918. Serial No. 260,861.

*To all whom it may concern:*

Be it known that we, JAMES HART ROBERTSON and DAVID JANKOWER, citizens of the United States, and residents of New York, in the county of New York and State of New York, have invented certain new and useful Improvements in Daylight Motion-Pictures, of which the following is a specification.

The object of this invention is the showing of motion pictures by daylight and consists of a combination of parts so arranged that the pictures are projected on a hidden transparent screen, set in a darkened hood, and reflected on a mirror of glass or polished metal in full view of the onlookers, the said mirror being arranged at such an angle to the horizontal and also to the said hidden transparent screen that the pictures are shown in a vertical position as in ordinary cases where the screen itself is in front of the onlookers.

Figure 1:
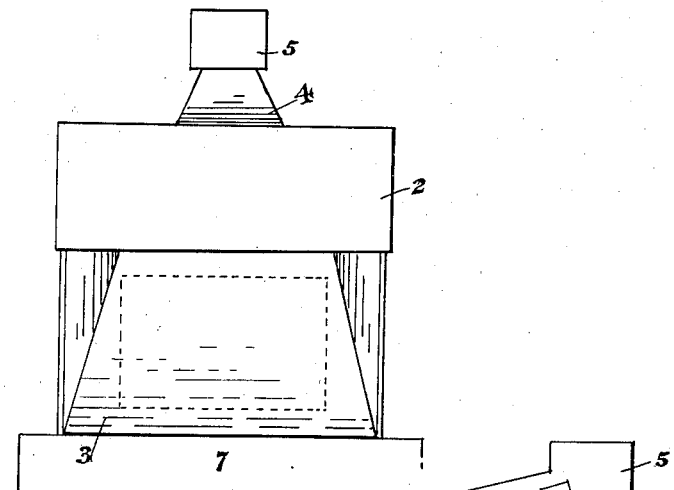
Figure 2:
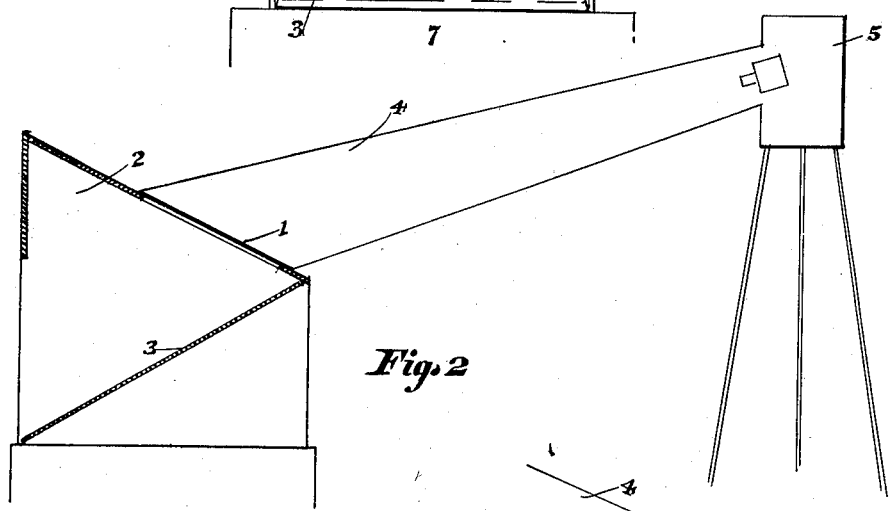
Figure 3:
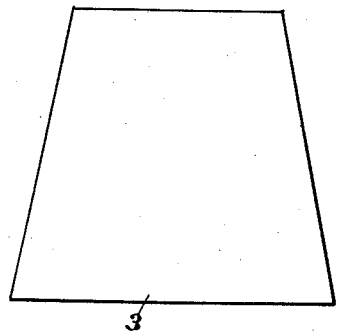

In the accompanying diagrams Figure 1, is a front view of the apparatus, the dotted lines indicating the reflection of the screen in the mirror; Fig. 2, a cross-section of the same; Fig. 3, a plan view of the mirror, and Fig. 4, a view in which the pictures are projected from the front instead of the rear of the apparatus as in Fig. 2.

The translucent screen 1 (Fig. 2), is set in the roof of hood 2 at an angle of about 60 degrees to the plane of the mirror 3, which mirror is placed at an angle of about 30 degrees to the horizontal. Connecting with the outer part of the roof of hood 2 is a light-proof tapering inclosure 4, having at its smaller end a projecting chamber 5, supported at the proper height by poles 6.

When the apparatus, such as described, is set up out of doors, it should be so placed that the sun rays will not strike the mirror, and the screen 1, should be shadowed by the hood of the partially darkened chamber of which it, the hood, forms the upper part, the entire inner surface of the said partially darkened chamber, with the exception of the screen and the mirror, being painted a dead black. The inner walls of the tapering inclosure 4, are also painted a dead black.

Figure 4:
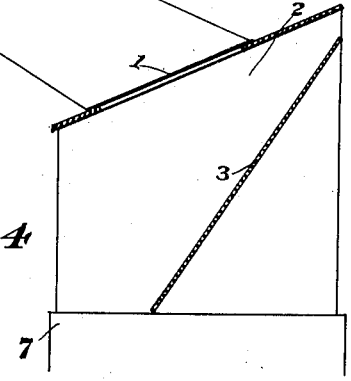

While the apparatus is devised especially for outdoor use, there are many places indoors where it may be used to advantage in daylight or under artificial light, but as there is seldom space enough to place the projector at the proper distance in the rear of the apparatus, the arrangement shown in Fig. 4, in which the projector is placed in front of the apparatus, is preferably used, the mirror, in this case being at an angle approaching nearer to the vertical, than shown in Fig. 2.

The angles of both, the mirror and the screen, may be modified to conform to the lines of vision between the onlookers and the reflecting mirror.

We are aware that it is old to use mirrors on the stage in producing certain optical illusions, but we believe that we are the first to so combine a mirror with the other parts necessary for the showing of motion pictures by daylight. By arranging the screen so that its surrounding hood protrudes downward from the upper part of the mirror, the interior of the hood is always in a darkened state, until the light and pictures from the projector are thrown on the translucent screen, which itself is reflected in the mirror, the top of which should be of the same width as the screen and gradually widen toward the bottom (Fig. 3), so that the pictures may be seen from the sides as well as from the front.

What we claim is:

An apparatus for the showing of motion pictures by daylight comprising a hood having a forwardly inclined top and overhanging sides, said top containing an opening, a translucent screen in said opening, a darkened projection chamber in front of said screen and a reflector mounted in said hood and at an angle to said screen, such that an image appearing on the screen will be reflected into a vertical plane.

Signed at New York in the county of New York and State of New York this 1st day of November A. D. 1918.

JAMES HART ROBERTSON.
DAVID JANKOWER.

Witnesses:
GEO. EMRICH,
WM. H. SIEGMAN.